(12) United States Patent
Staeck

(10) Patent No.: US 10,950,877 B2
(45) Date of Patent: Mar. 16, 2021

(54) MOISTURE EXCHANGER AND FUEL CELL ARRANGEMENT COMPRISING SAME

(71) Applicant: Volkswagen AG, Wolfsburg (DE)

(72) Inventor: Rune Staeck, Gifhorn (DE)

(73) Assignee: Audi AG, Ingolstadt (DE)

(*) Notice: Subject to any disclaimer, the term of this patent is extended or adjusted under 35 U.S.C. 154(b) by 278 days.

(21) Appl. No.: 15/109,085

(22) PCT Filed: Dec. 18, 2014

(86) PCT No.: PCT/EP2014/078528
§ 371 (c)(1),
(2) Date: Jun. 29, 2016

(87) PCT Pub. No.: WO2015/110236
PCT Pub. Date: Jul. 30, 2015

(65) Prior Publication Data
US 2016/0322655 A1    Nov. 3, 2016

(30) Foreign Application Priority Data

Jan. 23, 2014 (DE) .................... 10 2014 201 248.1

(51) Int. Cl.
| H01M 8/04119 | (2016.01) |
| F24F 3/147 | (2006.01) |
| H01M 8/1018 | (2016.01) |
| F24F 3/14 | (2006.01) |

(52) U.S. Cl.
CPC ......... H01M 8/04149 (2013.01); F24F 3/147 (2013.01); H01M 8/04141 (2013.01); F24F 2003/1435 (2013.01); H01M 2008/1095 (2013.01); H01M 2250/20 (2013.01); Y02T 90/40 (2013.01)

(58) Field of Classification Search
CPC ................. H01M 8/04149; F24F 3/147; F24F 2003/1435
See application file for complete search history.

(56) References Cited

U.S. PATENT DOCUMENTS

| 4,231,879 A | 11/1980 | Spranger |
| 4,784,768 A | 11/1988 | Mathieu |
| 5,882,516 A | 3/1999 | Gross et al. |
| 7,806,169 B2 * | 10/2010 | Yoshida .............. A61M 1/1698 165/140 |
| 9,070,913 B2 | 6/2015 | Kim et al. |
| 9,314,744 B2 | 4/2016 | Kim et al. |

(Continued)

FOREIGN PATENT DOCUMENTS

| CN | 102834958 | 12/2012 |
| DE | 2514763 | 10/1975 |

(Continued)

*Primary Examiner* — Ula C Ruddock
*Assistant Examiner* — Thomas H. Parsons
(74) *Attorney, Agent, or Firm* — Davidson, Davidson & Kappel, LLC

(57) ABSTRACT

A moisture exchanger (10) for transferring moisture between two gases, including a plurality of hollow fiber membranes (12). The moisture exchanger (10) includes at least one partition (34) between the hollow fiber membranes (12) and in that the plurality of hollow fiber membranes (12) is subdivided, at least in a section (36) of the length thereof, into zones (38) that are connected in parallel.

13 Claims, 3 Drawing Sheets

(56) References Cited

U.S. PATENT DOCUMENTS

| | | |
|---|---|---|
| 2004/0200768 A1 | 10/2004 | Dannenmaier et al. |
| 2005/0163656 A1 | 7/2005 | Galavotti |
| 2010/0068603 A1 | 3/2010 | Kanazawa et al. |
| 2012/0270120 A1 | 10/2012 | Kim et al. |

FOREIGN PATENT DOCUMENTS

| | | | |
|---|---|---|---|
| DE | 3709432 | | 10/1988 |
| DE | 19607162 | | 9/1997 |
| DE | 10244707 | | 4/2004 |
| DE | 10 2004 022 310 B4 | | 12/2005 |
| DE | 602005003243 | | 9/2008 |
| DE | 10 2008 028 832 A1 | | 12/2009 |
| DE | 102008028832 | * | 12/2009 |
| DE | 102012209846 | | 6/2013 |
| GB | 1500945 | | 2/1978 |
| JP | 2006314890 | | 11/2006 |
| JP | 2008103115 | | 5/2008 |
| JP | 2010107069 | | 5/2010 |
| JP | 2010117094 A | * | 5/2010 |

* cited by examiner

MOISTURE EXCHANGER AND FUEL CELL ARRANGEMENT COMPRISING SAME

The present invention relates to a moisture exchanger for transferring moisture between two gases, including a multitude of hollow fiber membranes. The present invention further relates to a fuel cell system including the same.

BACKGROUND

Fuel cells utilize the chemical reaction of a fuel with oxygen yielding water to generate electrical energy. For this purpose, fuel cells include the so-called membrane electrode assembly (MEA) as a core component, which is a combination of a proton-conducting membrane and a respective electrode situated on either side of the membrane (anode and cathode). In addition, gas diffusion layers (GDL) may be situated on either side of the membrane electrode assembly on the sides of the electrodes facing away from the membrane. In general, the fuel cell is formed by a plurality of MEAs arranged in a stack, whose electric power outputs are added up. During operation of the fuel cell, the fuel, in particular hydrogen ($H_2$), or a hydrogen-containing gas mixture, is supplied to the anode, where an electrochemical oxidation from $H_2$ to $H^+$ takes place, giving off electrons. A (waterbound or anhydrous) transport of the protons $H^+$ from the anode area to the cathode area takes place via the electrolyte or the membrane which separates the reaction chambers from each other in a gas-tight manner and electrically insulates them. The electrons provided at the anode are fed to the cathode via an electrical line. The cathode is supplied with oxygen, or an oxygen-containing gas mixture, so that a reduction from $O_2$ to $O^{2-}$ takes place, taking up the electrons. At the same time, these oxygen anions react in the cathode area with the protons transported via the membrane, forming water. Due to the direct conversion of chemical into electrical energy, fuel cells achieve a higher efficiency at low process temperatures compared to other energy converters by circumventing the Carnot factor.

The most advanced fuel cell technology at present is based on polymer electrolyte membranes (PEM), in which the membrane itself is made up of a polymer electrolyte. Acid-modified polymers, in particular perfluorinated polymers, are frequently used for this purpose. The most widely common representative of this class of polymer electrolytes is a membrane made of a sulfonated polytetrafluoroethylene copolymer (trade name: Nafion; copolymer of tetrafluoroethylene and a sulfonyl acid fluoride derivative of a perfluoroalkyl vinyl ether). The electrolytic conduction takes place via hydrated protons, which is why the presence of water is a requirement for the proton conductivity, and it is necessary to moisten the operating gases during operation of the PEM fuel cell. Due to the need for water, the maximum operating temperature of these fuel cells is limited to below 100° C. at normal pressure. Distinguishing it from high-temperature polymer electrolyte membrane fuel cells (HT PEM fuel cells), whose electrolyte conductivity is based on an electrolyte bound to a polymer backbone of the polymer electrolyte membrane with the aid of an electrostatic coordinative bond (for example, phosphoric acid-doped polybenzimidazole (PBI) membrane) and which are operated at temperatures of 160° C., this fuel cell type is also referred to as a low-temperature polymer electrolyte membrane fuel cell (LT PEM fuel cell).

DE 10 2004 022 310 B4 describes a moisture exchanger module including hollow fiber membranes situated in a bundle. At the center of the bundle, a perforated tube extends through the bundle in the axial direction, which is closed in the center of its axial expansion by a blocking element. The cavities of the bundle provided between the hollow fiber membranes are also closed by a blocking element in the center of the axial expansion of the bundle. During operation, the moist exhaust gas of the fuel cell flows through the individual hollow fiber membranes. The air to be moistened supplied to the fuel cell flows into the tube via one of its ends, leaves the tube upstream from the blocking element via the perforation, and flows through the cavities of the bundle to the outside, in part radially and in part axially. The air to be moistened thereafter flows around the blocking element in the bundle, and again flows in part radially, in part axially through the cavities on the other side of the blocking element to the perforation of the tube. In this way, a mixture of a cross-flow and a counter-flow moisture exchanger is implemented.

DE 10 2008 028 832 A1 describes a humidifier including hollow fibers, which are situated in layers and fixed by a connecting means, which is situated in multiple tracks on the layers. These tracks are oriented transversely to the hollow fibers. As a result of the tracks, a maze-like flow guidance is achieved.

According to FIG. 1, furthermore a moisture exchanger 10 having a plurality of hollow fibers 12 is known, which is designed according to a cross-flow principle. During operation of moisture exchanger 10, a gas 14 to be dehumidified flows into open ends 13 of hollow fibers 12 and flows through hollow fibers 12. From opposing open ends 13 of the same hollow fibers 12, dehumidified gas 16 flows out of hollow fibers 12. A gas 18 to be humidified flows into an inlet manifold 20 and is distributed in inlet manifold 20 across the length and width of hollow fibers 12, from where gas 18 to be humidified flows around the outer surfaces of hollow fibers 12 up to an outlet manifold 22. Humidified gas 24 thereafter leaves moisture exchanger 10 via outlet manifold 22.

SUMMARY OF THE INVENTION

It is an object of the present invention to provide a moisture exchanger having an increased efficiency.

According to the present invention, a moisture exchanger for transferring moisture between two gases, including a multitude of hollow fiber membranes, is provided. As a characterizing feature, it is provided that the moisture exchanger includes at least one partition, which is situated between the hollow fiber membranes and divides the multitude of hollow fiber membranes, at least in a subarea of their longitudinal extension, into parallel-connected areas.

By the at least one partition being situated between the hollow fiber membranes, and the multitude of hollow fiber membranes being divided into parallel-connected areas at least in a subarea of their longitudinal extension, a main flow direction of a flow occurring during operation on the outer surfaces of the hollow fiber membranes is essentially defined in this subarea by the at least one partition. In this way, a moisture exchanger which may be operated according to the counter-flow principle may be created in a simple manner. Analogously to heat exchangers, the counter-flow principle is understood to mean that a main flow direction of a flow through cavities in the interiors of the hollow fiber membranes is oriented counter to a main flow direction of a flow on the outer surfaces of the hollow fiber membranes. The counter-flow principle increases the efficiency of the moisture exchanger, whereby the same may have a more compact design.

The flows through the cavities in the interiors of the hollow fiber membranes and on the outer surfaces of the hollow fiber membranes are typically gas flows, one of the gas flows having a higher concentration of water (water vapor) than the other. The hollow fiber membranes are water-permeable membranes. A hollow fiber membrane may thus be understood to mean a cylindrical fiber which includes continuous channels in the cross section, connecting the inner cavity of the hollow fiber membrane to the outer surface of the hollow fiber membrane.

The multitude of hollow fiber membranes are preferably situated in the same direction. This means that hollow fiber membranes may be arranged as bundles or as stacks. In other words, the hollow fiber membranes may be arranged as a fiber packet. The arrangement in the same direction results in advantageous flow conditions in the cavities within the hollow fiber membranes and in the cavities between the hollow fiber membranes.

In one preferred embodiment of the present invention, it is provided that the at least one partition separates the parallel-connected areas in the subarea from each other in a gas-tight manner. In this way, any cross-flow between the parallel-connected areas is prevented, and a pure counter-flow moisture exchanger is implemented in the subarea.

In one preferred embodiment of the present invention, it is provided that the moisture exchanger includes an inlet, which is situated in particular laterally on the multitude of hollow fiber membranes, and/or an outlet, which is situated in particular laterally on the multitude of hollow fiber membranes, for supplying a gas to the outer surfaces of the hollow fiber membranes. In this way, the inlet and/or the outlet are fluidically connected to the outer surfaces of the hollow fiber membranes. By situating the inlet and/or the outlet laterally on the multitude of hollow fiber membranes, it is possible to implement compact outer dimensions of the moisture exchanger, while also reducing the material expenditure.

Preferably, it is provided that the parallel-connected areas are situated in a row next to each other, the lateral inlet and/or the lateral outlet preferably being situated on one end of this row. This configuration ensures that, e.g., proceeding from the inlet, the flow around the outer surfaces of the hollow fiber membranes consecutively reaches the parallel-connected areas. With the aid of the at least one partition, in this way a particularly effective counter-flow moisture exchanger is implemented, in which, with the aid of the partition, additionally dead zones in the flow around the outer surfaces may be prevented, or at least be reduced, particularly easily.

Preferably, it is provided that the lateral inlet and the lateral outlet are situated on opposite ends of the row. The inlet and the outlet are thus also situated on opposite sides of the multitude of the hollow fiber membranes. Due to the parallel-connected areas, the flows thus cover paths of identical lengths, so that the parallel-connected areas are equal to each other in terms of the flow.

According to one preferred embodiment of the present invention, it is provided that a flow-through cross-sectional area, proceeding from the lateral inlet and/or the lateral outlet, increasingly decreases toward a parallel-connected area situated the farthest away from the inlet and/or the outlet. Proceeding from the inlet and/or the outlet toward the parallel-connected area situated the farthest away, the values of the cross-sectional areas are thus (strictly) monotonically decreasing. These embodiments ensure that a flow-through cross-sectional area which connects the inlet and/or the outlet to the parallel-connected areas is appropriately adapted to the volume flow. In this way, a flow velocity between the inlet and/or the outlet and the parallel-connected areas may be kept preferably constant, whereby losses are reduced.

In one further preferred embodiment of the present invention, it is provided that the lateral inlet and the lateral outlet are situated on opposite ends of the longitudinal extension of the multitude of hollow fiber membranes. In this way, the length of the hollow fiber membranes is used optimally for the moisture transfer.

The at least one partition is preferably situated in a longitudinal extension direction of the hollow fiber membranes between the lateral inlet and the lateral outlet. This prevents flow deflections and thus minimizes a loss of pressure.

Preferably, it is provided that the moisture exchanger includes a respective manifold between the inlet and/or the outlet and the hollow fiber membranes. In the direction of the lateral extension of the multitude of hollow fiber membranes, the manifold preferably has maximally the extension of the inlet and/or outlet. Furthermore, the extension of the manifold may also exceed the extension of the inlet and/or outlet in the direction of the longitudinal extension of the multitude of hollow fiber membranes by maximally 100%, in particular by maximally 50%, preferably by maximally 25%. Furthermore, the manifold preferably extends across the entire width of the multitude of hollow fiber membranes. In this way, it is possible to distribute the gas to be humidified across the entire width of the moisture exchanger, and to have this gas flow around the entire length of the hollow fiber membranes.

Furthermore, a fuel cell system including a moisture exchanger according to the present invention is provided. Due to the high efficiency of the moisture exchanger, the fuel cell system is characterized particularly by its compact design.

Preferably, it is provided that outer surfaces of the multitude of hollow fiber membranes of the moisture exchanger are fluidically connected to a cathode inlet and a cathode outlet of a fuel cell of the fuel cell system in such a way that the moisture exchanger is operable as a counter-flow moisture exchanger. In this way, during operation of the fuel cell, water which developed during the fuel cell reaction is withdrawn from the exhaust gas of the fuel cell with the aid of the moisture exchanger and supplied to a fresh air flow. In this way, sufficient humidification of a membrane of the fuel cell is ensured. By operating the moisture exchanger as a counter-flow moisture exchanger, an optimal efficiency is achieved.

The various specific embodiments of the present invention described in the present application may advantageously be combined with each other, unless they are designed differently in the individual case.

BRIEF DESCRIPTION OF THE DRAWINGS

The present invention is described hereafter in exemplary embodiments based on the accompanying drawings.

DETAILED DESCRIPTION

Figure 1:
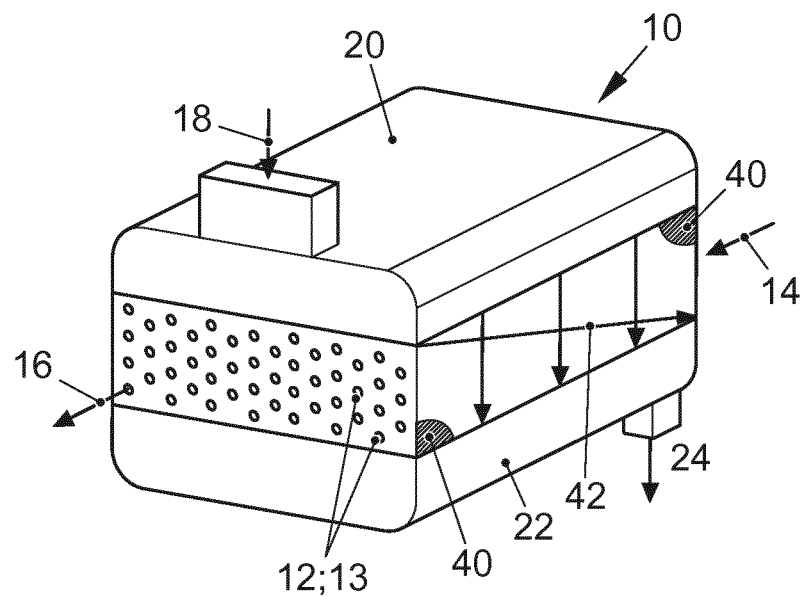
FIG. 1 shows a moisture exchanger according to the prior art.

FIG. 1 was already addressed with respect to the prior art.

Figure 2:
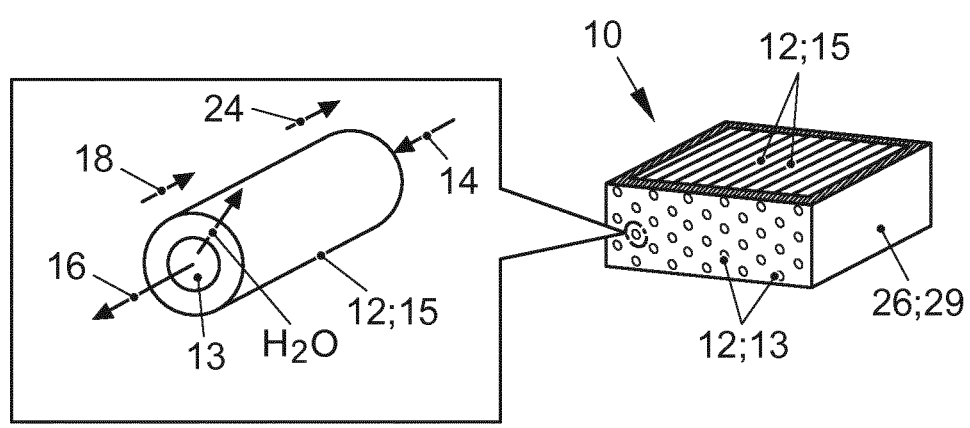
FIG. 2 shows an interior configuration of a moisture exchanger according to one preferred embodiment of the present invention.

FIG. 2 shows an interior configuration of a moisture exchanger 10 according to one preferred embodiment of the present invention. A multitude of hollow fiber membranes 12 may be molded, for example, arranged in a fiber packet in a housing frame 26, which is part of a housing 29. At each of their two ends, hollow fiber membranes 12 have an open end 13, which extends through housing frame 26. Furthermore, hollow fiber membranes 12 have outer surfaces 15, which are connected with the aid of channels, which are not shown, to cavities in the interior of hollow fiber membranes 12 situated between open ends 13. Through the channels, water ($H_2O$) enters through hollow fiber membranes 12 on their outer surfaces 15 during operation of moisture exchanger 10. The water stems from a gas 14 which is to be dehumidified and transferred to a gas 18 to be humidified.

Figure 3:
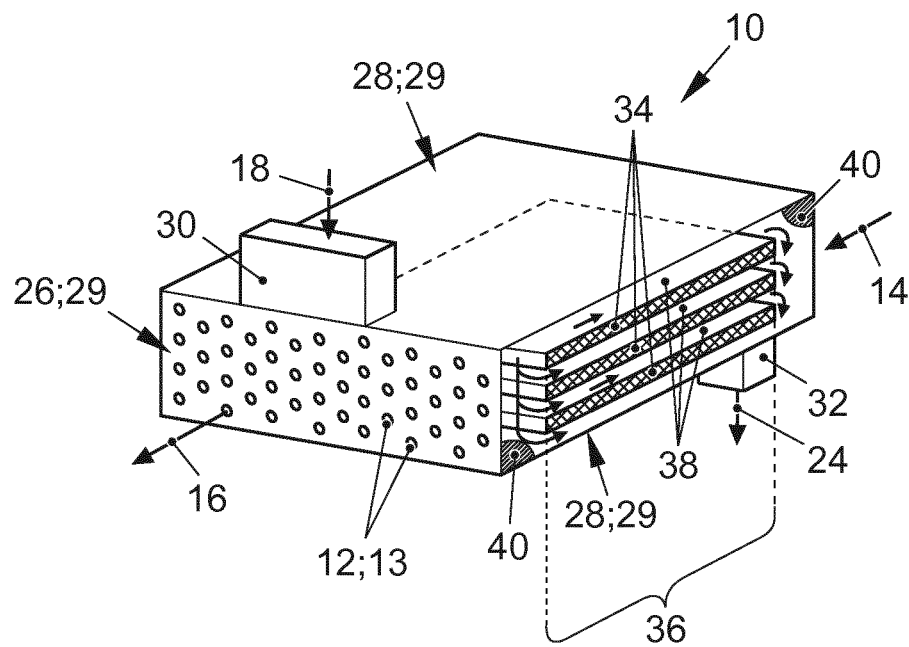
FIG. 3 shows a moisture exchanger according to one preferred embodiment of the present invention.

FIG. 3 shows a moisture exchanger 10 according to one preferred embodiment of the present invention. Housing frame 26 known from FIG. 2 may be closed toward the top and the bottom by housing covers 28, which include an inlet 30 situated laterally on the multitude of hollow fiber membranes 12 and/or an outlet 32 situated laterally on the multitude of hollow fiber membranes 12 for supplying outer surfaces 15 of hollow fiber membranes 12. Outer surfaces 15 of hollow fiber membranes 12 are thus situated in a housing 29 which is closed with the exception of inlet 30 and outlet 32 and which includes housing frame 26 and housing covers 28. For a simplified representation, the housing is shown in a semi-transparent representation in FIG. 3. In their simplest embodiment, inlet 30 and outlet 32 are continuous openings in a wall of housing 29. Furthermore, inlet 30 and/or outlet 32 may also be designed in such a way that gas 18 to be humidified is distributed across the entire width of the multitude of hollow fiber membranes 12 and/or humidified gas 24 is collected across the entire width of the multitude of hollow fiber membranes 12.

FIG. 3 shows partitions 34 according to the present invention, which are situated between hollow fiber membranes 12. Partitions 34 divide the multitude of hollow fiber membranes 12, at least in a subarea 36 of their longitudinal extension, into parallel-connected areas 38. Furthermore, partitions 36 divide the multitude of hollow fiber membranes 12 on their entire width. In the example, partitions 34 extend from one side of housing 29 to an opposite side of housing 29 and have a gas-tight design. Parallel-connected areas 38 in subarea 36 are separated from each other in a gas-tight manner with the aid of partitions 34. Partitions 34 may be molded into the housing, in particular housing frame 26, which is formed of a synthetic resin, for example.

It is apparent that parallel-connected areas 38 are situated in a row next to each other, lateral inlet 30 and lateral outlet 32 being situated on opposite ends of this row. Furthermore, it is apparent that lateral inlet 30 and lateral outlet 32 are situated on opposite ends of the longitudinal extension of the multitude of hollow fiber membranes 12. Furthermore, partitions 34 are situated between lateral inlet 30 and lateral outlet 32.

Compared to a moisture exchanger having no partitions 34, partitions 34 effectively reduce fluidic dead zones 40 (i.e., areas through which only poor flow or no flow at all occurs).

Figure 4:
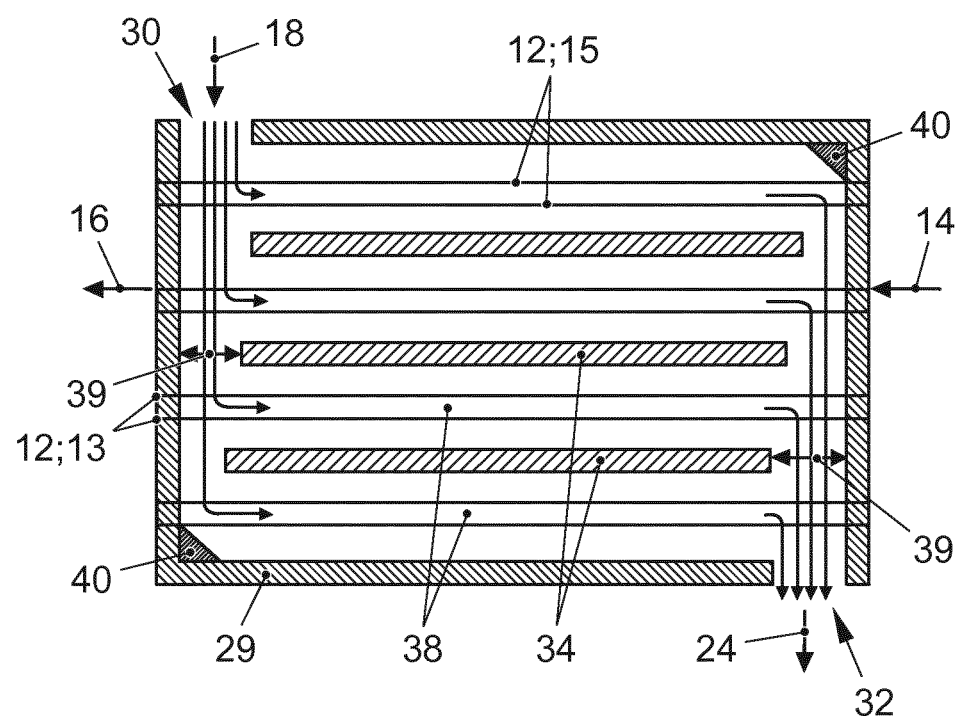
FIG. 4 shows a further moisture exchanger according to one preferred embodiment of the present invention.

FIG. 4 shows the interior configuration of a moisture exchanger 10 according to one preferred embodiment of the present invention in greater detail. Moisture exchanger 10 shown in FIG. 4 differs from that in FIG. 3 in that partitions 34 are situated offset from each other. The offset is designed in such a way that a cross-sectional area 39 allowing through-flow, proceeding from lateral inlet 30 toward a parallel-connected area 38 situated the farthest from inlet 30, increasingly decreases. Furthermore, a cross-sectional area 39 allowing through-flow increasingly decreases proceeding from lateral outlet 32 toward a parallel-connected area 38 situated the farthest away from outlet 32. This embodiment may further reduce dead zones 40 since partitions 34 which are closest to dead zones 40 may be brought closer to dead zones 40. Hollow fiber membranes 15 shown in FIGS. 2 and 4 may also have a loosely undulated profile.

Figure 5:
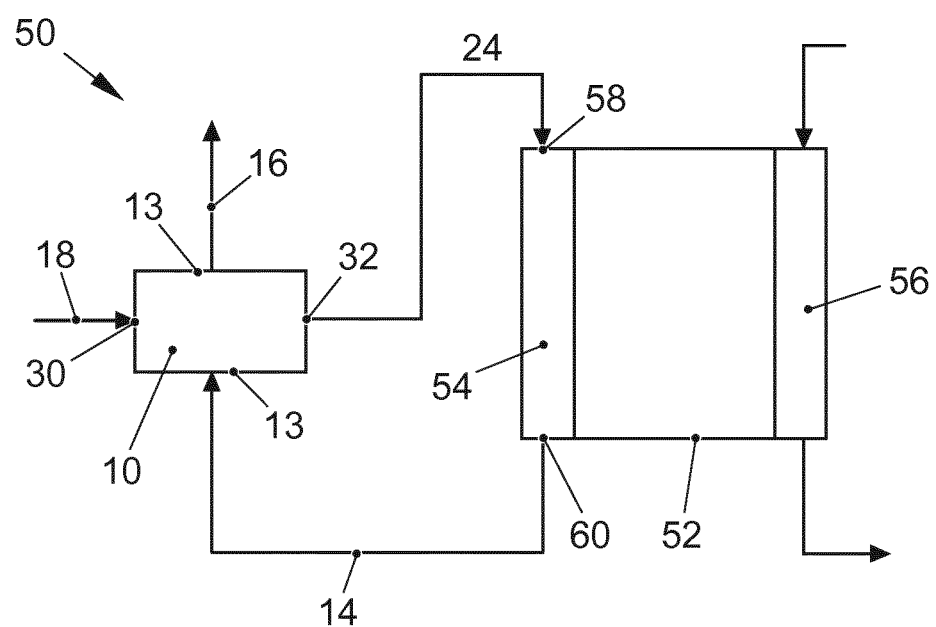
FIG. 5 shows a fuel cell system according to one preferred embodiment of the present invention.

FIG. 5 shows a fuel cell system 50 according to one preferred embodiment of the present invention. Fuel cell system 50 includes a fuel cell 52, which has a cathode side 54 and an anode side 56. Outer surfaces 15 of hollow fiber membranes 12 are connected to a cathode inlet 58 of fuel cell 52, and open ends 13 of hollow fiber membranes 12 are fluidically connected to a cathode outlet 60 of fuel cell 52. Fuel cell system 52 may be used to supply an electric motor with power to drive a vehicle, which is not shown.

The operating principle of moisture exchanger 10 and of fuel cell system 50 according to one preferred embodiment of the present invention shall be described in greater detail hereafter.

During operation, fuel cell 52 is supplied via anode side 56 with a fuel, e.g., hydrogen. Fuel cell 52 is supplied with fresh air (reaction air) via cathode side 54. To prevent a polymer electrolyte membrane (PEM) of fuel cell 52 from drying out, the supplied fresh air is humidified. This takes place with the aid of moisture exchanger 10, which withdraws moisture from an exhaust gas flow of fuel cell 52, i.e., gas 14 to be dehumidified, and supplies the moisture to the fresh air flow, i.e., gas 18 to be humidified. The moisture present in the exhaust gas flow stems from the fuel cell reaction and is recirculated to fuel cell 52 with the aid of moisture exchanger 10.

The transfer of the moisture takes place with the aid of moisture exchanger 10 in that gas 14 to be dehumidified flows in through open ends 13 on one end of hollow fiber membranes 12, flows through hollow fiber membranes 12, and leaves through open ends 13 at the other end of hollow fiber membranes 12 as dehumidified gas 16. Within hollow fiber membranes 12, the moisture condenses due to capillary condensation in the channels which connect outer surfaces 15 to the inner cavities of hollow fiber membranes 12. Gas 18 to be humidified enters inlet 30 and flows around outer surfaces 15 of hollow fiber membranes 12. During the flow around the outer surfaces, the moisture condensed in the channels evaporates and is entrained by the flow. At the same time, the condensed water seals the channels in a gas-tight manner. Humidified gas 24 leaves moisture exchanger 10 via outlet 32 and is subsequently supplied to fuel cell 52.

Moisture exchangers 10 according to FIGS. 3 and 4 differ compared to the previously known moisture exchangers (e.g., according to FIG. 1) in that now an operation according to the counter-flow principle is enabled with the aid of partitions 34 situated according to the present invention. For this purpose, a main flow direction of gas 18 to be humidified outside hollow fiber membranes 12 is oriented opposite a main flow direction of gas 14 to be dehumidified within hollow fiber membranes 12 in parallel-connected areas 38.

The flow guidance of the two gases 14, 18 has a crucial influence on a concentration difference of the water content of the two gases 14, 18 which is present across the membranes of hollow fiber membranes 12. Compared to the previously implemented cross-flow guidance according to FIG. 1, the counter-flow guidance now offers the advantage that the concentration difference between the two gases 14, 18 is approximately constant regardless of the position in moisture exchanger 10, while it is lower with increasing water exchange in the case of the cross-flow guidance. Moreover, moisture exchanger 10 according to FIG. 1 has a main flow direction 42 outside hollow fiber membranes 12 which is averaged between the inlet and the outlet, which entails the drawback that a flow around relatively large subareas of outer surfaces 15 is not possible, and thereby relatively large dead zones 40 are created.

With the aid of the at least one partition 34 according to the present invention, which serves as a subdivision of the multitude of hollow fiber membranes 12, dead zones 40 (i.e., the unused portions of hollow fiber membranes 12) are reduced on the one hand, and the flow is oriented in such a way that a counter-flow guidance in moisture exchanger 10 arises on the other hand.

LIST OF REFERENCE NUMERALS 10 moisture exchanger
12 hollow fiber membrane
13 open end of a hollow fiber membrane
14 gas to be dehumidified
15 outer surface of a hollow fiber membrane
16 dehumidified gas
18 gas to be humidified
20 inlet manifold
22 outlet manifold
24 humidified gas
26 housing frame
28 housing cover
29 housing
30 inlet
32 outlet
34 partition
36 subarea of the longitudinal extension of the multitude of hollow fiber membranes
38 parallel-connected areas
39 flow-through cross-sectional area
40 dead zone
42 real main flow direction
50 fuel cell system
52 fuel cell
54 cathode side
56 anode side
58 cathode inlet
60 cathode outlet

What is claimed is:

1. A moisture exchanger for transferring moisture between two gases, the moisture exchanger comprising:
a plurality of hollow fiber membranes extending in a length direction, the hollow fiber membranes being spaced from each other in a thickness direction and a width direction;
a housing including a housing frame housing the plurality of hollow fiber membranes, the housing frame having housing frame end walls including a plurality of openings, the plurality of fibers extending through and into the openings of the housing frame end walls, the housing having side walls in the length direction between the housing frame end walls;
at least one partition situated in the housing between the hollow fiber membranes and dividing the plurality of hollow fiber membranes in a plane extending in the length and width directions, and supported in the side walls of the housing but spaced apart from both of the housing frame end walls at partition ends to define a plurality of parallel-connected areas having a plurality of hollow fiber membranes spaced apart side-by-side in the width direction, the parallel connected areas being open between the side-by-side hollow fiber membranes to permit widthwise distribution of a first gas of the two gases, a length of the at least one partition being smaller than a side wall length of the side walls in the length direction so that the parallel-connected areas are connected at flow-through cross-sectional areas between the partition ends and the housing frame end walls so as to permit thicknesswise distribution of the first gas between the plurality of parallel-connected areas, a second gas of the two gases passing through the hollow fiber membranes.

2. The moisture exchanger as recited in claim 1 further comprising an inlet situated laterally on the plurality of hollow fiber membranes, or an outlet situated laterally on the plurality of hollow fiber membranes for supplying the first gas to outer surfaces of the hollow fiber membranes.

3. The moisture exchanger as recited in claim 2 wherein the lateral inlet or the lateral outlet is situated thicknesswise to be directly over or under the flow-through cross sectional areas.

4. The moisture exchanger as recited in claim 3 wherein the lateral inlet is situated at one of the housing frame end walls and the lateral outlet at an other of the housing frame end walls.

5. The moisture exchanger as recited in claim 3 wherein a size of the flow-through cross-sectional areas, proceeding from the lateral inlet or the lateral outlet, increasingly decreases toward one of the parallel-connected areas situated farthest away from the inlet or the outlet.

6. The moisture exchanger as recited in claim 2 wherein the lateral inlet and the lateral outlet are situated at opposite ends of the plurality of hollow fiber membranes.

7. The moisture exchanger as recited in claim 1 wherein the at least one partition is gas-tight.

8. A fuel cell system comprising the moisture exchanger as recited in claim 1.

9. The fuel cell system as recited in claim 8 further comprising a fuel cell, outer surfaces of the plurality of hollow fiber membranes being fluidically connected to a cathode inlet and a cathode outlet of the fuel cell so that the moisture exchanger is operable as a counter-flow moisture exchanger.

10. A method for operating the fuel cell system as recited in claim 8 comprising passing the second gas through the hollow fiber membranes and passing the first gas through the parallel connected areas, the first gas being distributed freely along an entire width of the parallel connected areas and passing through the flow-through cross-sectional areas.

11. The moisture exchanger as recited in claim 1 wherein the at least one partition includes partitions supported solely in side walls of the housing.

12. The moisture exchanger as recited in claim 1 wherein the at least one partition includes at least three partitions, each partition spaced apart from the housing frame end walls of the housing in the length direction by a different distance so that the flow-through cross sectional areas have different sizes at the partition ends of each of the three partitions.

13. The moisture exchanger as recited in claim 12 wherein the hollow fiber membranes extend in the length direction past the partitions and over or under the flow-through cross sectional areas.

* * * * *